N. FELTY.
FLOWER POT.
APPLICATION FILED JUNE 3, 1911.

1,035,561.

Patented Aug. 13, 1912.

Inventor
Nelson Felty.

Witnesses

By
Attorney

UNITED STATES PATENT OFFICE.

NELSON FELTY, OF ELIZABETHTOWN, PENNSYLVANIA.

FLOWER-POT.

1,035,561.    Specification of Letters Patent.    Patented Aug. 13, 1912.

Application filed June 3, 1911. Serial No. 631,154.

*To all whom it may concern:*

Be it known that I, NELSON FELTY, a citizen of the United States, residing at Elizabethtown, in the county of Lancaster and State of Pennsylvania, have invented certain new and useful Improvements in Flower-Pots; and I do hereby declare the following to be a full, clear, and exact description of the invention, such as will enable others skilled in the art to which it appertains to make and use the same.

This invention relates to new and useful improvements in flower pots.

Flower pots now in use are generally provided with an opening in the bottom for drainage, and also to permit the circulation of air around the roots of the flowers, which is very disadvantageous, because when the roots of the flowers begin to grow they extend to the opening, and consequently have to be cut off or die, which is very injurious to the plants. In watering the flowers the water soaks through the earth in the pot and runs off through the opening. To overcome these disadvantages, I provide a removable bottom to the flower pot, which will cover the opening, and at the same time allow the free circulation of air around the roots of the plants. Another advantage of this removable bottom is that it makes the pots suitable for containing young plants prior to the transplanting, because when removing the plants from the pots now in use, you are required to dig the plants up, which results in breaking the pots or ruining the plants, whereas by pushing up on the removable bottom through the opening in the lower end of the flower pot, the plant is removed, and may be placed in the ground without injury to the plant or retarding its growth.

With these and other objects in view, my invention consists of a novelly constructed bottom which will be comparatively simple and inexpensive to manufacture, reliable and efficient in use, and which will be hereinafter fully described and claimed.

Figure 1:
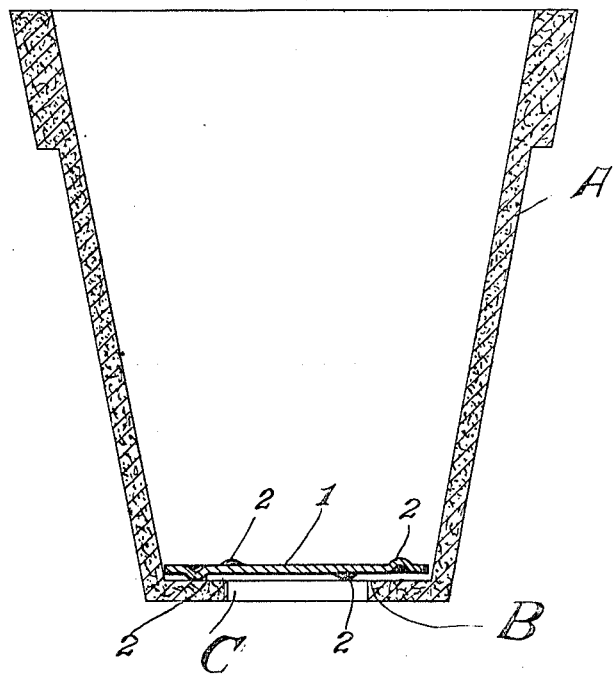
Figure 2:
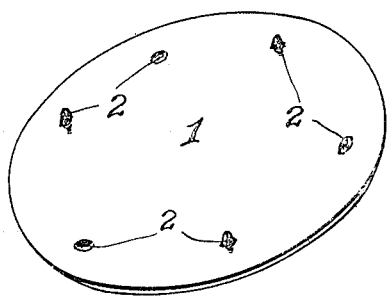

In the drawing—Figure 1 is a section through a flower pot, showing my improved bottom applied; and Fig. 2 is a perspective view of the removable bottom.

Referring now more particularly to the drawing, wherein like reference characters indicate like parts in all the figures, A indicates a flower pot, made of clay or the like, having a bottom or flange B, which is provided with an opening C. The opening C, as shown, is made larger than the openings in flower pots now in use, and is covered by my improved removable bottom 1, which is circular in form, and is provided adjacent its periphery with oppositely disposed lugs 2. This removable bottom is stamped from one piece of metal, which will render the same comparatively cheap to manufacture. It will be seen that this bottom, when placed in the flower pot, will cover the opening C, and the lugs 2 will rest upon the flange B, and thereby allow the necessary circulation of air around the roots through the opening formed between the lugs 2 of the bottom and the flange of the flower pot.

Having described this invention, what I claim, and desire to secure by Letters Patent is:

1. In combination with a flower pot, having a concentric opening in the bottom thereof surrounded by a normally horizontal flange, of a false bottom mounted on said flange comprising a disk extending substantially entirely across the bottom of said flower pot, having its periphery spaced slightly from the wall thereof, said disk being adapted to support all of the soil contained within the flower pot, and projections from said disk adjacent to the periphery thereof, said projections extending alternately above and below said disk.

2. A flower pot formed with an opening in its bottom and having a substantially horizontal flange surrounding said opening, and a false bottom consisting of a disk formed of rigid material and having the material of the disk pressed outwardly in places to form projections, said projections extending beyond both faces of the disk and adapted to seat on the flange aforesaid to space the disk from said flange, said disk being in superficial area substantially the interior area of the flower pot and adapted to support the soil within the flower pot when in position.

In testimony whereof I affix my signature in presence of two witnesses.

NELSON FELTY.

Witnesses:
A. KEAM,
A. C. HAMPTON.